(12) United States Patent
Zhang et al.

(10) Patent No.: US 10,455,602 B2
(45) Date of Patent: Oct. 22, 2019

(54) CONTROL OF CHANNEL REFERENCE SIGNAL TRANSMISSION IN A CELLULAR NETWORK

(71) Applicant: Telefonaktiebolaget LM Ericsson (publ), Stockholm (SE)

(72) Inventors: Hanzhi Zhang, München (DE); Torsten Dudda, Aachen (DE); Per Synnergren, Gammelstad (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 15/507,974

(22) PCT Filed: Sep. 1, 2014

(86) PCT No.: PCT/EP2014/068510
§ 371 (c)(1),
(2) Date: Mar. 1, 2017

(87) PCT Pub. No.: WO2016/034194
PCT Pub. Date: Mar. 10, 2016

(65) Prior Publication Data
US 2017/0265212 A1 Sep. 14, 2017

(51) Int. Cl.
*H04W 72/12* (2009.01)
*H04L 5/00* (2006.01)
*H04W 72/04* (2009.01)

(52) U.S. Cl.
CPC ....... *H04W 72/1221* (2013.01); *H04L 5/0048* (2013.01); *H04W 72/042* (2013.01); *H04W 72/1268* (2013.01)

(58) Field of Classification Search
CPC ......... H04W 72/1221; H04W 72/1268; H04W 72/042; H04L 5/0048
See application file for complete search history.

(56) References Cited

U.S. PATENT DOCUMENTS 8,391,190 B2   3/2013  Pan et al.
2009/0116434 A1*  5/2009  Lohr ............... H04L 5/0007
                                              370/329

(Continued)

FOREIGN PATENT DOCUMENTS

EP   2190225 A1   5/2010
EP   2388958 A1   11/2011

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1, Jun. 2014, 1-57.

(Continued)

*Primary Examiner* — Ian N Moore
*Assistant Examiner* — Justin T Van Roie
(74) *Attorney, Agent, or Firm* — Sage Patent Group

(57) ABSTRACT

A communication device checks whether data is available in an uplink data buffer of the communication device for uplink transmission employing uplink radio resources, the uplink radio resources being previously allocated to the communication device in reoccurring time intervals. Depending on said checking, the UE controls the transmission of a channel reference signal.

20 Claims, 12 Drawing Sheets

(56) References Cited

U.S. PATENT DOCUMENTS

| | | |
|---|---|---|
| 2010/0284314 A1 | 11/2010 | Pelletier et al. |
| 2011/0205975 A1 | 8/2011 | Umesh et al. |
| 2011/0268087 A1 | 11/2011 | Kwon et al. |
| 2012/0069805 A1 | 3/2012 | Feuersanger et al. |
| 2013/0301579 A1 | 11/2013 | Zhang et al. |
| 2014/0133447 A1 | 5/2014 | Moulsley et al. |
| 2015/0215945 A1 | 7/2015 | Hsu et al. |

FOREIGN PATENT DOCUMENTS

| | | |
|---|---|---|
| EP | 2434790 A1 | 3/2012 |
| EP | 2675081 A1 | 12/2013 |
| WO | 2012024040 A1 | 2/2012 |
| WO | 2013169173 A1 | 11/2013 |
| WO | 2014051478 A1 | 4/2014 |
| WO | 2016034193 A1 | 3/2016 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.2.0, Jun. 2014, 1-207.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 1-365.

Unknown, Author, "HTTP Archive—Trends", http://httparchive.org/trends.php, URLs Analyzed, Jul. 22, 2014, 1-6.

Unknown, Author, "UE Buffer Status Reporting in E-UTRAN", 3GPP TSG-RAN WG2 meeting #59bis, R2-074204, Ericsson, Shanghai, China, Oct. 8-12, 2007, 1-3.

\* cited by examiner

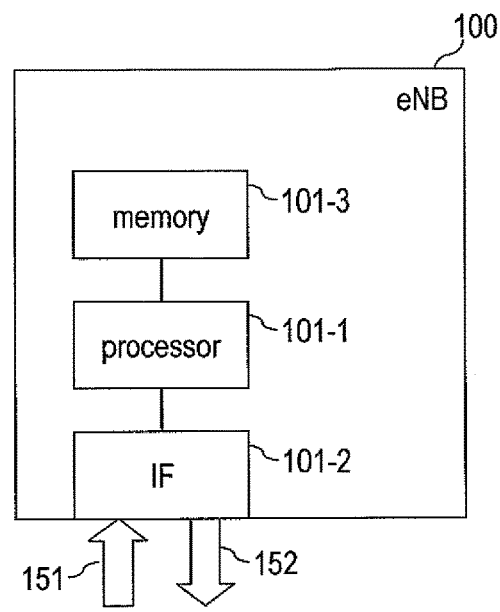
FIG. 8
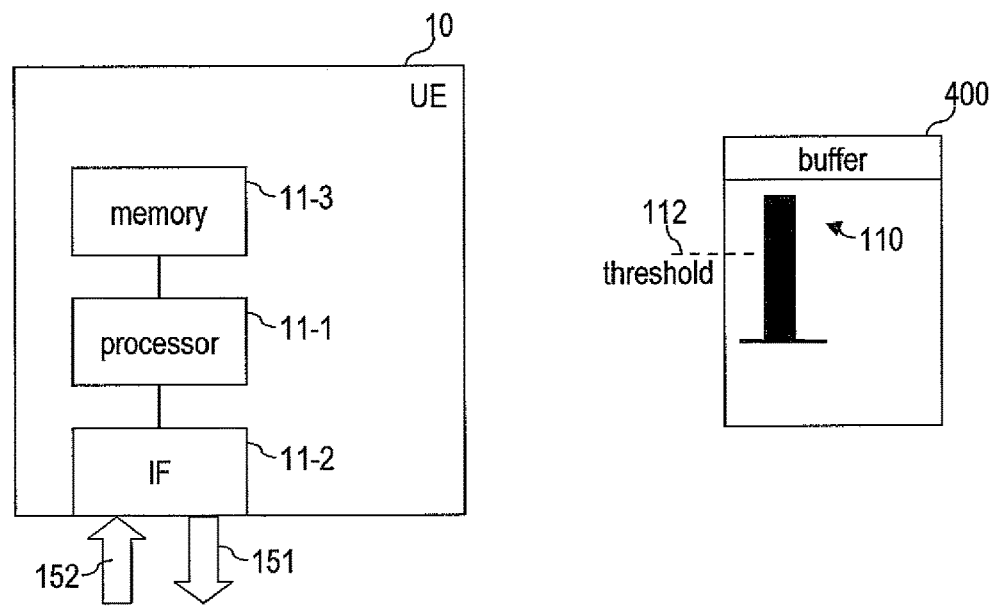
FIG. 9
FIG. 10

US 10,455,602 B2

CONTROL OF CHANNEL REFERENCE SIGNAL TRANSMISSION IN A CELLULAR NETWORK

TECHNICAL FIELD

Various embodiments relate to a method of controlling a transmission of a channel reference signal and to a corresponding communication device and a corresponding network node of a cellular network.

BACKGROUND

Typically, a transmission reliability of an uplink transmission from a communication device (UE) to a base station of a cellular network depends on a channel quality of the uplink channel. To increase the transmission reliability, it is possible to adapt various parameters of the uplink channel, e.g., properties of a multi-antenna transmission, time and/or frequency resources employed for the uplink transmission, etc. This is sometimes referred to as link adaptation.

To enable comparably accurate and effective link adaptation, it is typically required to assess the quality of the uplink channel. For this, a channel reference signal may be employed. The channel reference signal may be transmitted according to a transmission pattern, i.e., at pre-defined time positions and/or frequency positions. E.g., one such channel reference signal is the sounding reference signal (SRS) in as specified by the Third Generation Partnership Project (3GPP) Technical Specification (TS) 36.213, version 12.2.0 of June 2014, section 8.2.

Generally, transmitting the channel reference signal requires resources on the uplink channel. E.g., in case of the 3GPP Long Term Evolution (LTE) standard, a certain symbol of a subframe may be occupied by the channel reference signal. Therefore, while—in terms of accurate link adaptation—frequent transmission of the channel reference signal may be favoured, on the other hand the frequent transmission cause increased traffic on the uplink channel and may thereby lead to increasing interference, etc. Resources on the uplink channel are therefore occupied.

SUMMARY

Therefore, a need exists for advanced techniques of controlling a transmission of a channel reference signal. In particular, a need exists for techniques which enable to flexible control the transmission of the channel reference signal in view of, both, accurate link adaptation and reduced resource occupation on the uplink channel.

This need is met by the features of the independent claims. The dependent claims define embodiments.

According to an aspect, a method of controlling a transmission of a channel reference signal on an uplink channel from a UE to a cellular network is provided. The channel reference signal enables to assess a quality of the uplink channel. A method comprises the UE checking whether data is available in an uplink data buffer of the UE for uplink transmission employing uplink radio resources on the uplink channel. The uplink radio resources are previously allocated to the UE in reoccurring time intervals. The method further comprises the UE controlling the transmission of the channel reference signal depending on said checking.

According to a further aspect, a UE configured to control a transmission of a channel reference signal on an uplink channel from the UE to a cellular network is provided. The channel reference signal enables to assess a quality of the uplink channel. The UE comprises at least one processor configured to check whether data is available in an uplink data buffer of the UE for uplink transmission employing uplink radio resources on the uplink channel. The uplink radio resources are previously allocated to the UE in reoccurring time intervals. The at least one processor is further configured to control the transmission of the channel reference signal depending on said checking.

According to a further aspect, a method of controlling a transmission of a channel reference signal on an uplink channel between a UE and a cellular network is provided. The channel reference signal enables to assess a quality of the uplink channel. The method comprises a network node of the cellular network checking whether the UE performs an uplink transmission employing uplink radio resources on the uplink channel. The uplink radio resources are previously allocated to the UE in reoccurring time intervals. The method further comprises controlling the transmission of the channel reference signal depending on said checking.

According to a further aspect, a network node for a cellular network configured to control a transmission of a channel reference signal on an uplink channel between a UE and the cellular network is provided. The channel reference signal enables to assess a quality of the uplink channel. The network node comprises an interface configured to receive an uplink transmission from the UE. The network node further comprises at least one processor configured to check whether the UE performs the uplink transmission employing uplink radio resources on the uplink channel. The uplink radio resources are previously allocated to the UE in reoccurring time intervals. The at least one processor is further configured to control the transmission of the channel reference signal depending on said checking.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 8 schematically illustrates a base station for a cellular network according to an embodiment of the invention.

FIG. 9 schematically illustrates a UE according to an embodiment of the invention.

FIG. 10 is a schematic representation of an uplink data buffer of the UE according to an embodiment of the invention, the uplink data buffer including data scheduled for uplink transmission to the cellular network.

DETAILED DESCRIPTION OF EMBODIMENTS

Figure 1:
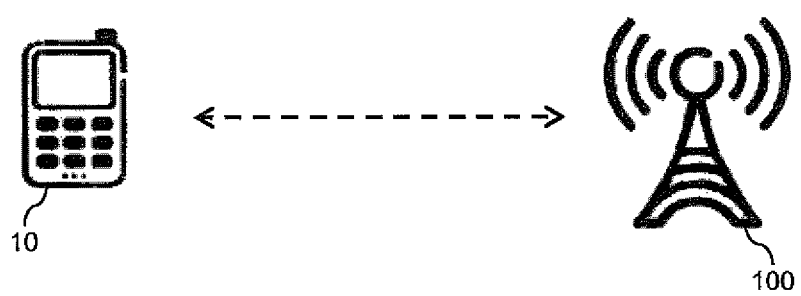
FIG. 1 schematically illustrates an exemplary cellular network environment with elements which may be involved in controlling uplink transmissions according to an embodiment of the invention.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

The illustrated embodiments relate to concepts for controlling channel reference signal transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, techniques are illustrated which allow to control the transmission of a channel reference signal on an uplink channel from a UE to a cellular network. The channel reference signal enables to assess a quality of the uplink channel. Hereinafter, reference will be primarily made to the SRS in the 3GPP LTE radio access technology, however, the techniques may be readily applied to other kinds of channel reference signals. Further, techniques are illustrated for an evolved Node B (eNB) in the 3GPP LTE radio access technology. In general, it is possible to readily apply the techniques presented hereinafter to base stations of other cellular networks.

In particular, hereinafter techniques are illustrated which allow to control the transmission of the SRS in a framework in which the uplink transmission of data relies at least partly on uplink radio resources which have been previously allocated to the UE in reoccurring time intervals. By employing such previously allocated uplink radio resources, it becomes possible to reduce a latency of the uplink transmission. Once data becomes available in an uplink data buffer of the UE, transmission of the data in the uplink data buffer can commence quickly employing the previously allocated uplink radio resources. At the same time, it is possible to implicitly or explicitly request further uplink radio resources for the transmission of the data, e.g., by sending data, sending a buffer status report (BSR), and/or sending an explicit grant.

According to the illustrated concepts, uplink transmissions from a UE to the cellular network are performed on uplink radio resources which may be allocated by two types of uplink grants: first uplink grants, in the following referred to as IUA uplink grant (IUA: Instant Uplink Access), which each indicate radio resources allocated to the UE in reoccurring time intervals, and second uplink grants, in the following referred to as dynamic uplink grant (D-uplink grant), which each indicate uplink radio resources allocated to the UE in a certain time interval. The radio transmissions may be organized in radio frames each formed of a sequence of subframes, and the afore-mentioned time intervals may correspond to the individual subframes. For example, in the LTE radio access technology the time intervals may correspond to subframes of 1 ms duration. The IUA uplink grant may be prospectively provided to the UE in preparation of a future uplink transmission by the UE, without any indication of a specific need to transmit data by the UE. As compared to that, the D-uplink grants are provided to the UE in a dynamic manner, in particular on an as-needed basis. For example, a D-uplink grant may be sent in response to a scheduling request by the UE or in response to a BSR from the UE. The IUA-UL grant and the D-UL grants may be sent on a DL control channel, such as a Physical DL Control Channel (PDCCH) of the LTE radio access technology. By means of the IUA grants, a low latency associated with an uplink transmission by the UE may be provided. Specifically, on the uplink radio resources indicated by the IUA-uplink grant, the UE may perform the uplink transmission without previously indicating to the cellular network that there is a need to transmit data, e.g., by sending a scheduling request. Rather, the data can be transmitted in the next one of the reoccurring time intervals.

In the illustrated concepts, the allocated uplink radio resources indicated by the IUA-uplink grant are assumed to be utilized in a conditional manner. Specifically, for each of the time intervals the UE selects between an active mode and an inactive mode. In the active mode, the UE performs an uplink transmission on the allocated uplink radio resources indicated by the IUA-uplink grant. Conditions triggering the selection of the active mode may be a need to send data by the UE and/or a need to send a BSR by the UE and/or receiving a D-uplink grant. In the inactive mode, the UE performs no uplink transmission on the previously allocated uplink radio resources indicated by the IUA-uplink grant. The cellular network expects this behaviour of the UE and correspondingly selects between the active mode and the inactive mode. Specifically, the cellular network may detect that the UE performed an uplink transmission on the uplink radio resources indicated by the IUA-uplink grant and select the active mode to receive the uplink transmission. If the uplink transmission is received successfully, the cellular network may acknowledge this by sending a positive acknowledgement (ACK) to the UE. If the uplink transmission not received successfully, the cellular network may notify this by sending a negative acknowledgement (NACK) to the UE. E.g., sending of such ACKs or NACKs may be performed on the basis of a HARQ (Hybrid Automatic Repeat Request) protocol, e.g., as defined for the LTE radio access technology. Further, the cellular network may detect that the UE performed an uplink transmission on the uplink radio resources indicated by the IUA-uplink grant and may select the inactive mode. In the latter case, the cellular network may refrain from attempting to receive any uplink transmission on the uplink radio resources indicated by the IUA-uplink grant or taking any further action concerning such uplink transmission, e.g., sending acknowledgements.

By the conditional utilization of the previously allocated uplink radio resources indicated by the IUA-uplink grant, it can be avoided that the UE needs to perform an uplink transmission in each time interval, which allows for energy efficient operation of the UE and may also avoid unnecessary interference due to the uplink transmissions on the uplink radio resources indicated by the IUA-uplink grant.

FIG. 1 illustrates exemplary elements which may be involved in implementing a corresponding control of an uplink scheduling process. FIG. 1 illustrates a UE 10. The UE 10 may correspond to a mobile phone, a smartphone, a computer with wireless connectivity, or the like. As an example of a network node of the cellular network which is responsible for controlling radio transmission by the UE 10, FIG. 1 illustrates a base station 100. It is noted that, for brevity of description, the network node 100 may be also referred to as node in the following. In accordance with the assumed utilization of the LTE radio access technology, the base station 100 is embodied as eNodeB and will in the following also be referred to as eNB. The eNB 100 is assumed to be responsible for performing the scheduling of uplink transmissions, in particular providing the IUA-uplink grants and providing the D-uplink grants.

Figure 2:
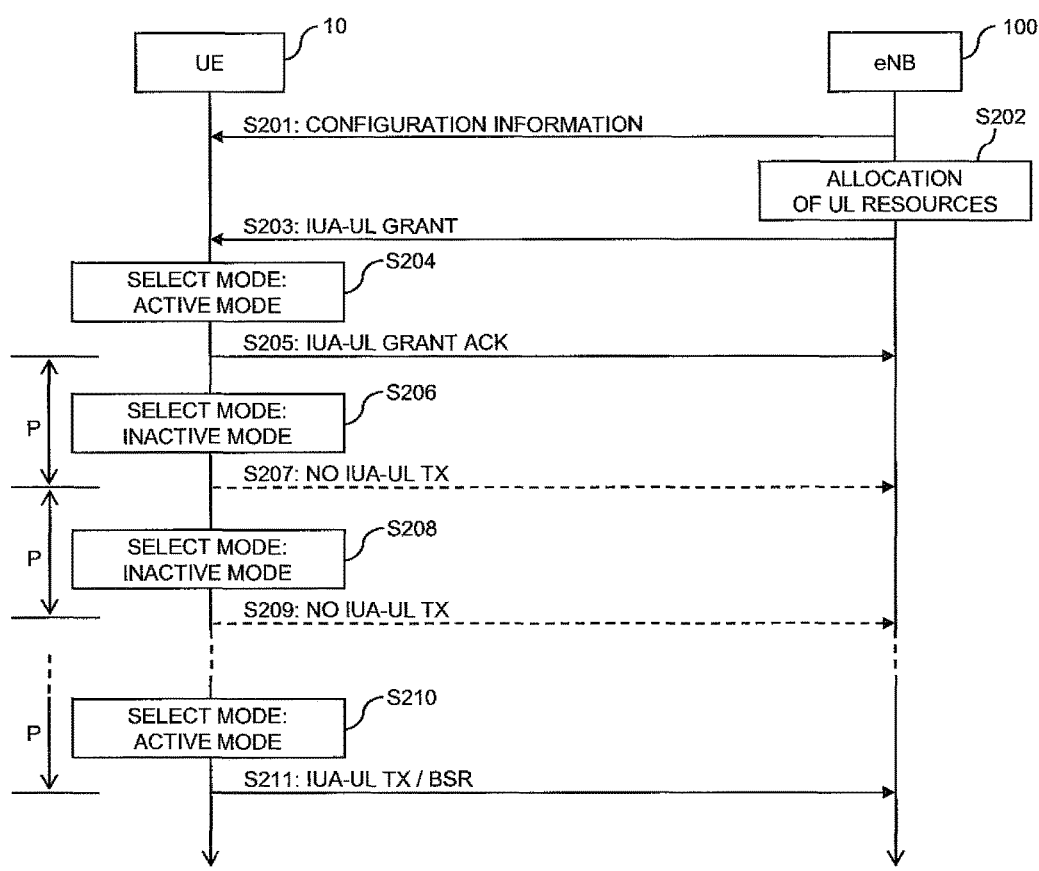
FIG. 2 schematically illustrates an exemplary process for performing uplink radio transmissions according to an embodiment of the invention.

It is to be understood that also other nodes may be involved in controlling at least a part of the uplink scheduling process. For example, when utilizing the UMTS radio access technology, a network node referred to as RNC (Radio Network Controller) could implement similar functionalities as explained for the eNB 100 and/or could be realised by a similar hardware structure, as explained for the eNB 100 with reference to FIG. 8. FIG. 2 shows an exemplary processes of performing uplink transmissions on the basis of the IUA-uplink grant. The processes of FIG. 2 involve the UE 10 and the eNB 100.

At step S201, the eNB 100 may send configuration information to the UE 10. The configuration information may for example indicate radio resources of an uplink control channel which are allocated to the UE 10, e.g., radio resources of a Physical Uplink Control Channel (PUCCH). Further, the configuration information could also provide various other kinds of information for establishing connectivity between the UE 10 and the eNB 100. The configuration information may also indicate a configuration to be utilized by the UE 10 for various kinds of reporting to the cellular network, e.g., reporting of Channel State Information (CSI) or conditions for triggering a BSR. The configuration information may for example be sent in an RRC (Radio Resource Control) message or by some other form of control signaling, e.g., in a MIB (Master Information Block) or SIB (System Information Block).

At step S202, the eNB 100 may allocate uplink radio resources to the UE 10. Specifically, the eNB 100 allocates these uplink radio resources in periodically reoccurring time intervals to the UE 10, e.g., in each subframe or in some other predefined sequence of subframes, such as in every second subframe, every third subframe, every fourth subframe, or the like. In general, it is not necessary that the uplink radio resources are allocated to the UE for time intervals that are arranged periodically. These uplink radio resources may be radio resources of an uplink data channel, such as the Physical uplink Shared Channel (PUSCH) in case of the 3GPP LTE radio access technology. The uplink data channel may be used to execute uplink transmission for payload or uplink data and control data; an uplink control channel—such as the PUCCH in case of the 3GPP LTE radio access technology—may be employed for the transmission of control data.

The eNB 100 then sends an IUA-uplink grant S203 to the UE 10. The IUA-uplink grant of step S203 indicates the previously allocated uplink radio resources of step S202. The IUA-UL grant of step S203 may be sent on the PDCCH. For example, the previously allocated uplink radio resources may be indicated in terms of one or more resource blocks (RBs). Further, the IUA-uplink grant may also indicate a periodicity in which the previously allocated uplink radio resources reoccur. Alternatively, such periodicity could also be indicated by separate control information, e.g., the control information of step S201. In FIG. 2, the periodicity in which the previously allocated uplink radio resources reoccur is indicated by P corresponding to a time offset between two time intervals with uplink radio resources previously allocated by the IUA-uplink grant. In the following this time interval is also referred to as IUA period.

The IUA-uplink grant may be provided with an indicator which allows the UE 10 to distinguish the IUA-uplink grant from other types of grants, e.g., a D-uplink grant. Such indicator may for example be included in an information field of the IUA-uplink grant. Further, the indicator could also be provided by utilizing a specific identifier to address the IUA-uplink grant to the UE 10, e.g., a specific C-RNTI (Cell Radio Network Temporary Identity). For example, a one C-RNTI could be provided for addressing IUA-uplink grants to the UE 10, and one or more other C-RNTIs could be provided for addressing other types of IUA-uplink grants to the UE 10, such as D-uplink grants.

After receiving the IUA-uplink grant in step S203, the UE 10 may enter the IUA operation, in which the previously allocated uplink radio resources indicated by the IUA uplink grant may be instantly utilized for performing low latency uplink transmissions. In the IUA operating mode, the UE 10 checks for each of the time intervals with the previously allocated uplink radio resources whether a condition for selecting the active mode is met. If this is the case, the UE 10 selects the active mode and performs an uplink transmission on the previously allocated uplink radio resources.

If this is not the case, the UE 10 selects the inactive mode and performs no transmission on the previously allocated uplink radio resources.

As illustrated by step S204, in the first time interval with the previously allocated uplink resources indicated by the IUA-uplink grant of step S203, the UE 10 may select the active mode to perform an uplink transmission on the previously allocated resources which includes an acknowledgement (IUA-uplink grant ACK) in step S205 of receipt of the IUA-uplink grant by the UE 10. The IUA-uplink grant acknowledgement of step S205 may confirm to the eNB 100 that the UE 10 entered the IUA operating mode, which for example means that the eNB 100 should expect an uplink transmission on the previously allocated uplink radio resources indicated by the IUA-uplink grant of step S203. The IUA-uplink grant acknowledgement of step S205 may for example correspond to a IUA-uplink TX with data padding, i.e., without actual meaningful data but a predefined or random data pattern, such as only zeros.

As further illustrated by steps S206 and S208, in some time intervals with previously allocated uplink radio resources indicated by the IUA-uplink grant of step S203, the UE 10 may select the inactive mode. In this case, the UE 10 performs no uplink transmission on the previously allocated uplink radio resources indicated by the IUA-uplink grant (no IUA-uplink TX), as indicated by the dashed arrows of steps S207 and S209.

As further illustrated by step S210, in some time intervals with previously allocated uplink radio resources indicated by the IUA-uplink grant of step S203, the UE 10 may select the active mode to perform in a step S211 an uplink transmission on the previously allocated uplink radio resources indicated by the IUA-uplink grant (IUA-uplink TX). Selecting the active mode at step 210 may for example be triggered by a need for transmission of data in a transmission buffer of the UE 10. In such case, the IUA-uplink TX 211 may include at least a part of this data and a BSR. Selecting the active mode at step S210 could also be triggered by a need to send a BSR by the UE 10, without a need for transmission of data. In such case, the IUA-uplink TX 211 may include the BSR, but no data.

Figure 3:
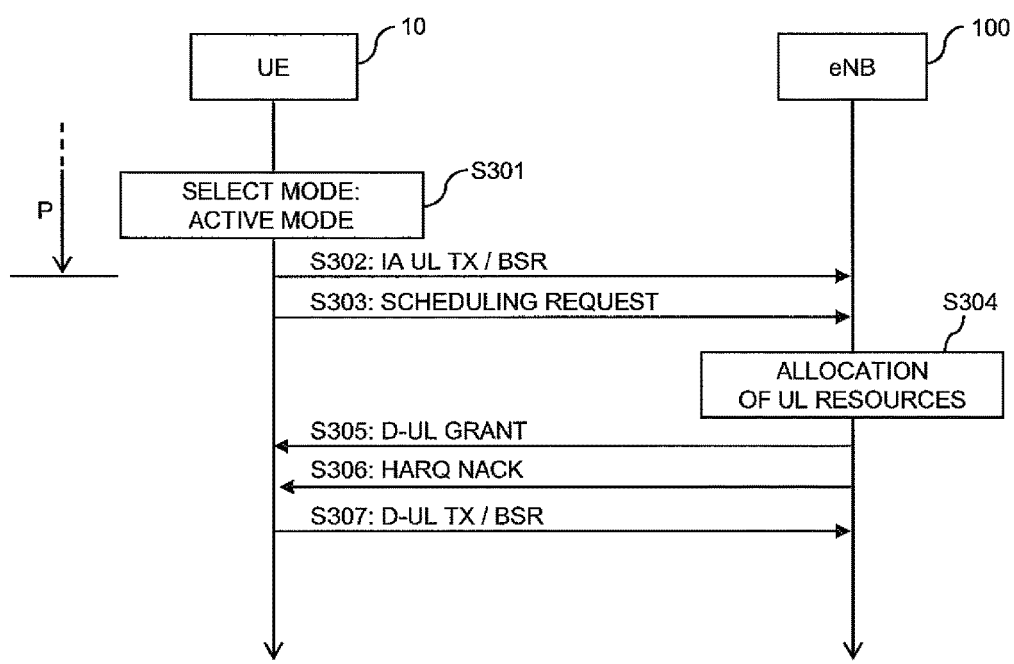
FIG. 3 schematically illustrates a further exemplary process for performing uplink radio transmissions according to an embodiment of the invention.

FIG. 3 shows further exemplary processes of performing uplink transmissions on the basis of the IUA-uplink grant. Also the processes of FIG. 3 involve the UE 10 and the eNB 100. The processes of FIG. 3 may, e.g., be performed in the IUA operating mode of the UE 10, after receiving the IUA-uplink grant.

As indicated by step S301, in a certain time interval with previously allocated uplink radio resources indicated by the IUA-uplink grant, the UE 10 may select the active mode to perform an uplink transmission of data on the previously allocated uplink radio resources indicated by the IUA-uplink grant, in FIG. 3 illustrated by IUA-uplink TX in step S302 (which may also include a BSR).

In addition to sending the IUA-uplink TX of step S302, the UE 10 may also send a scheduling request in step S303 to the eNB 100.

As indicated by step S304, in response to the scheduling request, the eNB 100 performs allocation of further uplink radio resources to the UE 10, step S304. The eNB 100 sends a D-uplink grant to the UE 10 in step S305 which indicates these further uplink radio resources.

In the processes of FIG. 3, it is further assumed that the IUA-uplink TX of step S302 could not be successfully received by the eNB 100, e.g., due to poor link adaptation between the UE 10 and the eNB 100. Accordingly, the eNB 100 notifies the UE 10 of the failed reception by sending a HARQ NACK, step S306.

The HARQ NACK of step S306 causes the UE 10 to retransmit the data on the further uplink radio resources indicated by the D-uplink grant of step S305, as indicated by dynamic uplink transmission (D-uplink TX) in step S307. Similar to IUA-uplink TX 302, also the D-uplink transmission in step S307 may include a BSR.

In the processes of FIG. 3, sending the scheduling request in step S305 together with the initial IUA-uplink TX of step S302 allows for avoiding additional delays if the IUA-uplink TX fails, i.e., for achieving a similar performance with respect to latency as in the case of utilizing only scheduling request based dynamic scheduling.

Figure 4:
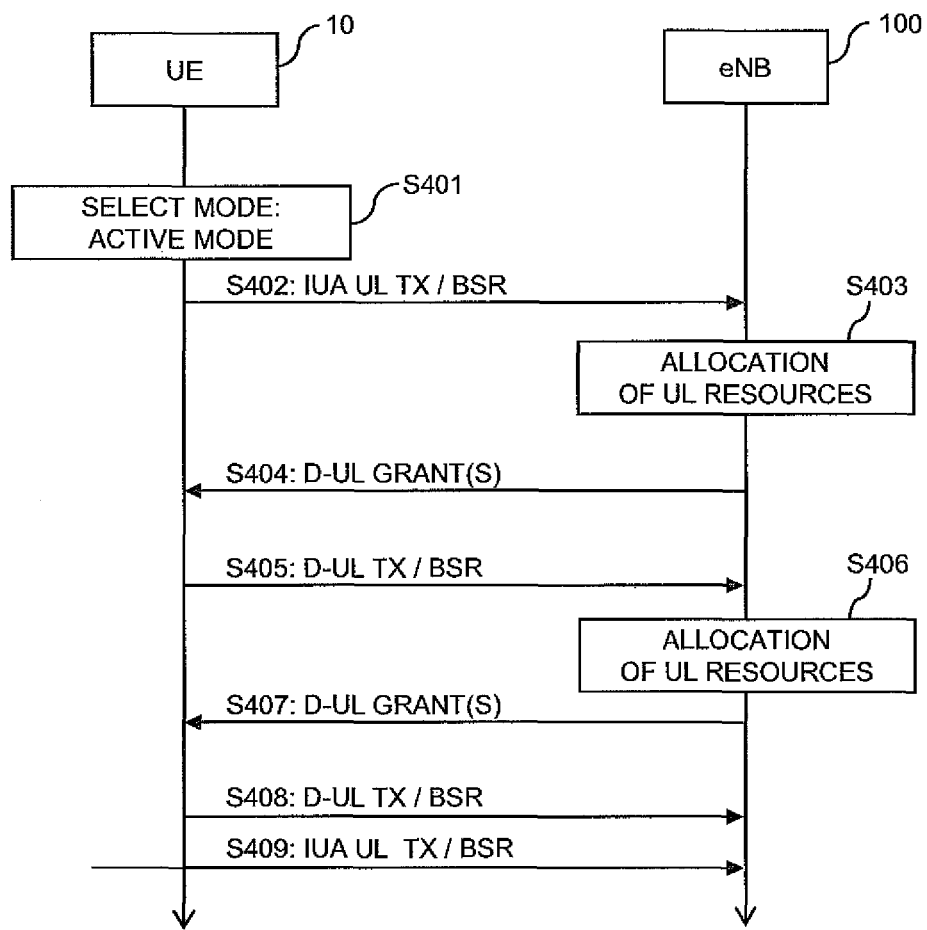
FIG. 4 schematically illustrates a further exemplary process for performing uplink radio transmissions according to an embodiment of the invention.

FIG. 4 shows further exemplary processes of performing uplink transmissions on the basis of the IUA-uplink grant. Also the processes of FIG. 4 involve the UE 10 and the eNB 100. The processes of FIG. 4 may for example be performed in the IUA operating mode of the UE 10, after receiving the IUA-uplink grant.

As indicated by step S401, in a certain time interval with previously allocated uplink radio resources indicated by the IUA-uplink grant, the UE 10 may select the active mode to perform an uplink transmission of data on the previously allocated uplink radio resources indicated by the IUA-uplink grant, which is illustrated in FIG. 4 by the IUA-uplink TX in step S402. As illustrated, the IUA-uplink TX of step S402 also includes a BSR. The BSR indicates an amount of further data pending for transmission by the UE 10.

As indicated by step S403, on the basis of the BSR in IUA-uplink TX of step S402, the eNB 100 performs allocation of further uplink radio resources to the UE 10. The eNB 100 sends a D-uplink grant in a step S404 to the UE 10 which indicates these further uplink radio resources.

The UE 10 may then transmit at least a part of the further data on the further uplink radio resources indicated by the D-uplink grant of step S404, as indicated by D-uplink transmission, step S405. Also D-uplink transmission of step S405 includes a BSR which indicates an amount of further data pending for uplink transmission by the UE 10.

As indicated by step S406, on the basis of the BSR in D-uplink TX of step S405 the eNB 100 performs allocation of the further uplink radio resources to the UE 10. The eNB 100 sends a further D-uplink grant in step S407 to the UE 10 which indicates these further uplink radio resources.

The UE 10 may then transmit at least a part of the further data in the uplink transmission buffer of the UE 10 on the further uplink radio resources indicated by the D-uplink grant of step S407, as indicated by D-uplink transmission in step S408. Again, D-uplink transmission of step S408 includes a BSR which indicates an amount of further data pending for transmission by the UE 10.

As further illustrated, the UE 10 may also perform a further IUA-uplink TX in step S409 at a later time interval with the previously allocated uplink radio resources indicated by the IUA-uplink grant. Again, IUA-uplink TX of step S409 includes a BSR which indicates an amount of further data pending for transmission by the UE 10.

As can be seen from the processes of FIG. 4, the BSR in a IUA-uplink TX may trigger allocation of further uplink radio resources which may then be indicated in a D-uplink grant. These further uplink radio resources may then be used alternatively or in addition to the previously allocated uplink radio resources indicated by the IUA-uplink grant for transmission of data. In this way, the amount of uplink radio resources allocated to the UE 10 may be dynamically adapted to the current uplink traffic demand of the UE 10, while at the same time allowing fast initial access to uplink radio resources.

Figure 5:
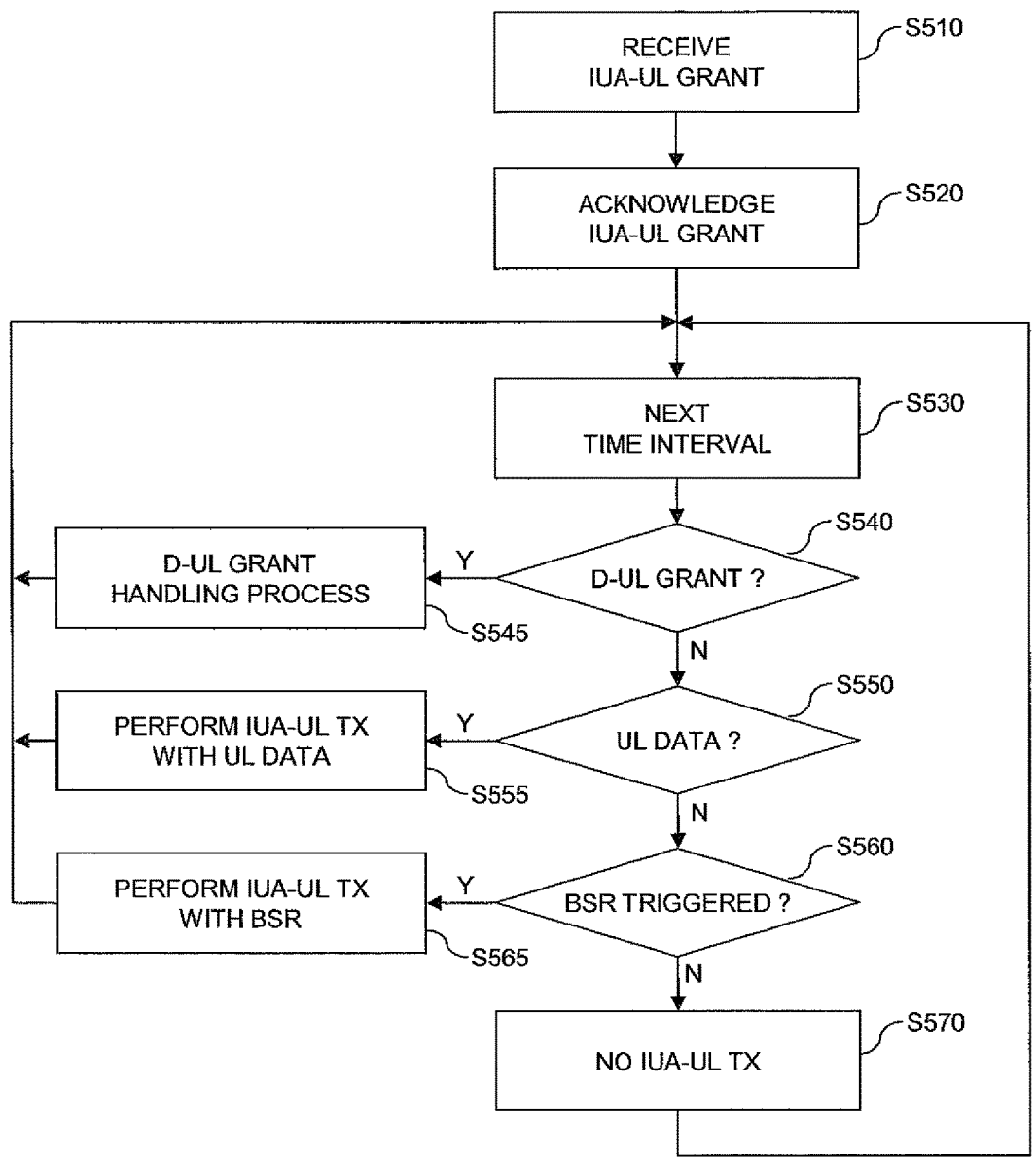
FIG. 5 shows a flowchart for illustrating a method according to an embodiment of the invention, which may be implemented by a UE.

FIG. 5 shows a flowchart for illustrating a method which may be utilized for controlling the UE 10 to operate in accordance with the above-mentioned concepts. If a processor based implementation of the UE 10 is used, the steps of the method may be performed by one or more processors of the UE 10. For this purpose, the processor(s) may execute correspondingly configured program code. Further, at least some of the corresponding functionalities may be hardwired in the processor(s).

At step S510, the UE 10 receives the IUA-uplink grant. The communication device may receive the IUA-UL grant on a DL control channel, e.g., on the PDCCH of the LTE radio access technology. The IUA-uplink grant indicates radio resources allocated to the UE 10 in reoccurring time intervals, e.g., corresponding to a periodic pattern of subframes.

As indicated by step S520, the UE 10 may then acknowledge receipt of the IUA-uplink grant, e.g., by performing a padded uplink transmission on the previously allocated uplink radio resources indicated in the IUA-uplink grant.

The UE 10 may then enter the IUA operation and perform the following actions when reaching a next time interval with previously allocated uplink radio resources indicated in the IUA-uplink grant, as indicated by step S530.

At step S540, the UE 10 may check whether a D-uplink grant was received by the UE 10. If this is the case, the utilization of the D-uplink grant may be prioritized over the utilization of the IUA-uplink grant, and the method may proceed with step S545, as indicated by branch "Y".

At step S545, further uplink radio resources indicated by the D-uplink grant may be utilized for performing a D-uplink transmission. If no data is available in the uplink data buffer for the uplink transmission, the D-uplink transmission may include a BSR, but no data.

For the next time interval, the method may then return to step S530.

If at step S540 no D-uplink grant was received by the UE 10, the method may proceed with step 550, as indicated by branch "N".

At step S550, the UE 10 may check whether data need to be transmitted by the UE 10. If this is the case, the method may proceed with step S555, as indicated by branch "Y".

At step S555, the UE 10 selects the active mode and performs an IUA-uplink TX on the previously allocated uplink radio resources indicated in the IUA-uplink grant. This IUA-uplink TX includes at least a part of the data and may further include a BSR. For the next time interval, the method may then return to step S530.

If at step S550 there is no need for transmission of data, the method may proceed with step S560, as indicated by branch "N".

At step S560, the UE 10 may check whether a trigger condition for sending a BSR is fulfilled. If this is the case, the method may proceed with step S565, as indicated by branch "Y".

At step S565, the UE 10 selects the active mode and performs an IUA-uplink TX on the previously allocated uplink radio resources indicated in the IUA-uplink grant. This IUA-uplink TX includes a BSR, but no data. For the next time interval, the method may then return to step S530.

If at step S560 no trigger condition for sending a BSR is fulfilled, the method may proceed with step S570, as indicated by branch "N".

At step S570, the UE 10 selects the inactive mode and performs no IUA-uplink TX on the previously allocated uplink radio resources indicated in the IUA-uplink grant. For the next time interval, the method may then return to step S530.

Figure 6:
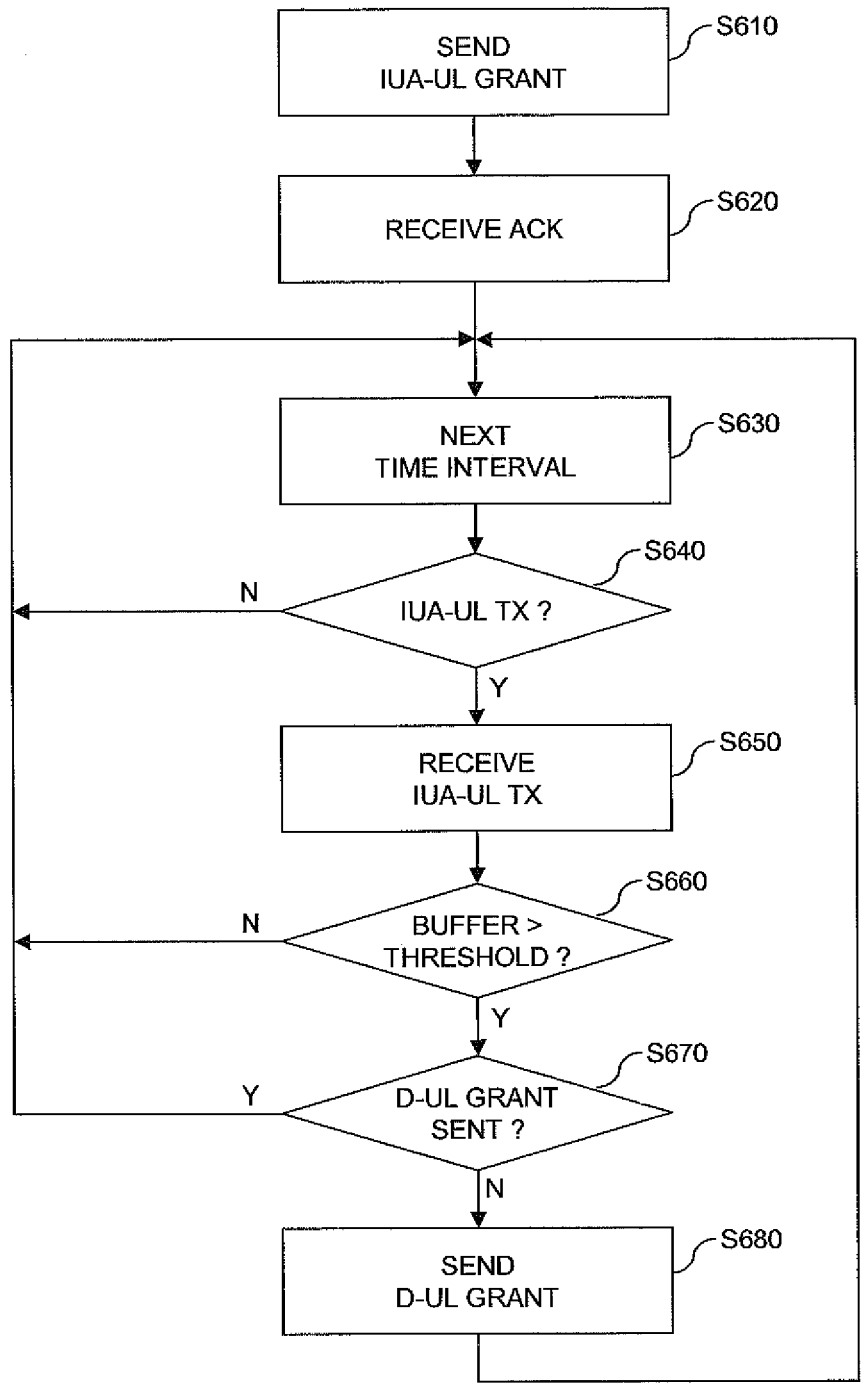
FIG. 6 shows a flowchart for illustrating a method according to an embodiment of the invention, which may be implemented by a network node.

FIG. 6 shows a flowchart for illustrating a method which may be implemented by a node of the cellular network, e.g., the eNB 100, to control a UE 10 in accordance with the above-mentioned concepts. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step S610, the node sends the IUA-uplink grant to the UE 10. The node may send the IUA-UL grant on a DL control channel, e.g., on the PDCCH of the LTE radio access technology. The IUA-grant indicates radio resources allocated to the communication device in periodically reoccurring time intervals, e.g., corresponding to a periodic pattern of subframes.

As indicated by step S620, the node may then receive an acknowledgement of receipt of the IUA-uplink grant by the UE 10. For example, the acknowledgement may be indicated by a padded uplink transmission on the previously allocated uplink radio resources indicated in the IUA-uplink grant.

The node may then enter the IUA operation and perform the following actions when reaching a next time interval with previously allocated uplink radio resources indicated in the IUA-uplink grant, as indicated by step S630.

At step S640, the node may check whether the UE 10 performed an IUA-uplink TX on the previously allocated uplink radio resources indicated in the IUA-uplink grant. For this purpose, the node may for example detect a signal level on the previously allocated uplink radio resources. If the signal level is above a threshold, the node may determine that the UE 10 performed an IUA-uplink TX on the previously allocated uplink radio resources indicated in the IUA-uplink grant.

If at step S640 no IUA-uplink TX on the previously allocated uplink radio resources indicated in the IUA-uplink grant is detected, the method may return to step S630 for the next time interval, as indicated by branch "N".

If at step S640 an IUA-uplink TX on the previously allocated uplink radio resources indicated in the IUA-uplink grant is detected, the method may continue with step S650, as indicated by branch "Y".

At step S650, the node may receive the IUA-uplink TX. As mentioned, above the IUA-uplink TX may also include a BSR. Further, the IUA-uplink TX may include data.

At step S660, the node may check if the BSR indicates that an amount of data to be transmitted by the UE 10 is above threshold amount of data. The threshold amount of data may be preconfigured or may be calculated in a dynamic manner, e.g., on the basis of a HARQ roundtrip time $T_{HRTT}$, in units of the time intervals with previously allocated uplink radio resources indicated by the IUA-uplink grant, and a size $S_{IUAG}$ of the IUA-uplink grant, i.e., the data capacity of the previously allocated uplink radio resources indicated by the IUA-uplink grant. For example, the threshold amount of data may be calculated according to:

$$\text{Threshold} = T_{HRTT} * S_{IUAG} + A. \quad (1)$$

where A may be a constant or function that may be used to ensure that sending a D-uplink grant is only triggered if the amount of data still to be sent after the HARQ roundtrip time $T_{HRTT}$ is not too small.

If at step S660 the amount of data to be transmitted is not above the threshold amount of data, the method may return to step S630 for the next time interval, as indicated by branch "N".

If at step S660 the amount of data to be transmitted is above the threshold amount of data, the method may continue with step S670, as indicated by branch "Y".

At step S670, the node may check whether a D-uplink grant was already sent to the UE 10, but not yet utilized. If this is the case, the method may return to step S630 for the next time interval, as indicated by branch "Y".

If at step S670 it is found that there is no D-uplink grant which was sent to the UE 10, but not yet utilized, the method may continue with step S680 as indicated by branch "N".

At step S680, the node may send a new D-uplink grant to the UE 10. The size $S_{DG}$ of this new D-uplink grant may be determined on the basis of amount of data $V_B$ indicated in the BSR and the size $S_{IUAG}$ of the IUA-uplink grant, e.g., according to:

$$S_{DG} = V_B - T_{HRTT} * S_{IUAG}. \quad (2)$$

After sending the D-uplink grant at step S680, the method may return to step S630 for the next time interval.

By the checks in steps S660 and S670 of FIG. 6, it can be avoided that a D-uplink grant is sent to the UE 10 which is actually not required. Specifically, the check of step S660 may ensure that the D-uplink grant is sent if transmission of the data on the previously allocated uplink radio resources indicated in the IUA-uplink grant is not possible before the D-uplink grant is received by the UE 10.

Figure 7:
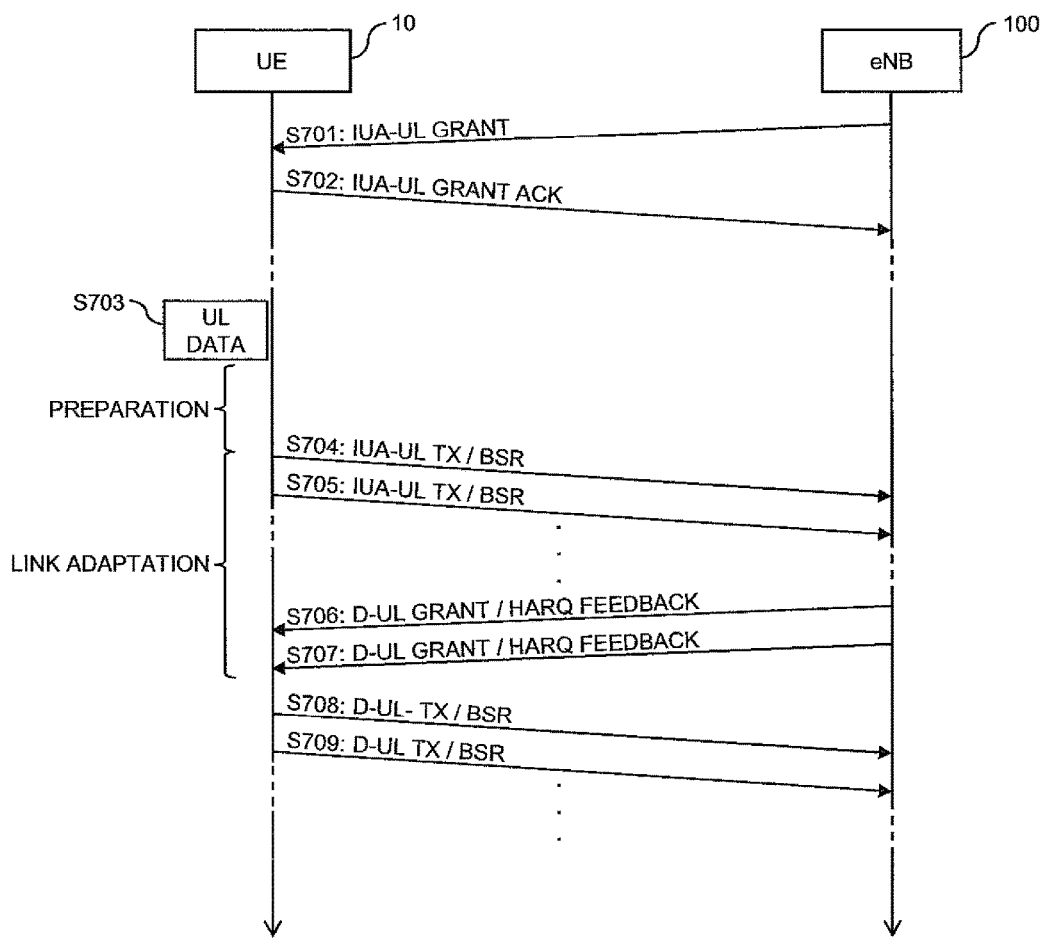
FIG. 7 schematically illustrates an exemplary sequence of processes for performing uplink radio transmissions according to an embodiment of the invention.

FIG. 7 shows further a typical sequence of processes for performing uplink transmissions on the basis of the IUA-uplink grant. Also the processes of FIG. 7 involve the UE 10 and the eNB 100.

In the processes of FIG. 7, initially the eNB 100 sends a IUA-uplink grant to the UE 10 in step S701. The IUA-uplink grant indicates uplink radio resources allocated to the UE 10 in periodically reoccurring time intervals. In the example of FIG. 7, it is assumed that these IUA uplink radio resources are allocated in each subframe. The IUA-uplink grant of step S701 may be sent on the PDCCH.

The UE 10 then performs an initial IUA-uplink TX with an IUA-uplink grant acknowledgement in step S702. If the UE 10 has no data to transmit, the IUA-uplink grant acknowledgement may be a IUA-uplink TX with padding. The IUA-uplink grant acknowledgement of step S702 confirms receipt of the IUA-uplink grant in step S701 to the eNB 100. If the IUA-uplink grant acknowledgement of step S702 is not received by the eNB 100, the eNB 100 may resend the IUA-uplink grant of step S701. The usage of the IUA-uplink grant acknowledgement in step S702 is optional and may for example be configured during connection configuration, e.g., by the control information of step S201 of FIG. 2. The IUA-uplink grant may be valid for an open time duration, e.g., until de-configured by the eNB 100. Alternatively, also a validity period could be indicated together with the IUA-uplink grant in step S701 or in separate control information, such as the control information of step S201 of FIG. 2.

When data for transmission becomes available at the UE 10, the UE 10, as indicated by step S703, the UE 10 may prepare one or more IUA-uplink TXs on the previously allocated uplink radio resources of the IUA-uplink grant. FIG. 7 also illustrates a corresponding processing time, e.g., associated with layer 2 and layer 1 processing. If a BSR is triggered, the UE 10 may also add the BSR to the IUA-uplink TXs.

The UE 10 then perform IUA-uplink TXs in steps S704, S705 at the next time intervals with previously allocated uplink radio resources indicated by the IUA-uplink grant.

When the eNB 100 receives the IUA-uplink TXs of steps S704, S705, it may evaluate the included BSR to decide whether sending of one or more D-uplink grants to the UE 10 is appropriate, e.g., using processes as explained in connection with FIG. 6.

In the illustrated example, the eNB 100 sends D-uplink grants in steps S706 and S707 to the UE 10. As further illustrated, these D-uplink grants of steps S706, S707 may be accompanied by HARQ feedback with respect to the IUA-uplink TXs of steps S704, S705.

While performing the IUA-uplink TXs in steps S704, S705 and transmitting the D-uplink grants in steps S706, S707, the UE 10 and the eNB 100 may accomplish link adaptation of the radio connection between the UE 10 and the eNB 100, e.g., by selecting a suitable modulation and coding scheme (MCS) and/or transmission power. This link adaptation phase may last for about one HARQ roundtrip time, e.g., eight subframes. After that, a higher performance may be achieved due to optimized link adaptation.

The UE 10 may then continue performing uplink transmissions on the further allocated radio resources indicated by the D-uplink grants of steps S706, S707, as illustrated by D-uplink transmissions of steps S708 and S709. As illustrated, the D-uplink transmissions of steps S708, S709 may each include a BSR, so that further D-uplink grants may be issued to the UE 10 as long as it has data for transmission.

Summarizing, such a state as illustrated above wherein which data becomes available and the UE 10 transmits data employing the previously allocated uplink radio resources indicated by the IUA-uplink grant and/or request the further uplink radio resources may therefore be referred to as an active state of the UE 10. If no data is available in the uplink data buffer, one may refer to the scenario as an inactive state of the UE 10. Generally it is possible that the transmission of the SRS is controlled depending on whether the UE 10 is in inactive state or active state. E.g., a higher (lower) frequency of occurrence of transmission of the SRS may be selected, if the UE 10 is in active (inactive) state.

Controlling the transmission of the SRS can occur in various ways. E.g., a parameter for the transmission of the SRS may be selected. The parameter may indicate at least one of a timing of the transmission of the SRS and a property of the SRS. The timing can relate to various scenarios: In particular, a frequency of occurrence of the transmission of the SRS may be selected; e.g., the SRS may be sent periodically with a given periodicity. Generally, a time-frequency pattern for the transmission of the SRS may be selected. A further way of controlling the timing of the SRS is to send an aperiodic SRS in a next time slot of a pre-determined transmission pattern for the transmission of the SRS. Also, various properties of the SRS can be selected as part of the controlling; e.g., a signal amplitude of the SRS and/or a frequency bandwidth of the SRS may be selected. As can be seen, there exists various techniques of controlling the transmission of the SRS and it is feasible to apply such techniques either in isolation or in combination according to various embodiments.

As can be seen from the above, the present techniques enable to flexibly adapt the transmission of the SRS. E.g., if data is available in the uplink data buffer of the UE 10, the transmission of the SRS may be controlled such that an accurate link adaptation is possible. If no data is available in the uplink data buffer, less accurate link adaptation may be tolerable, at the benefit of reducing power consumption of the UE 10 and reducing a signalling load on the uplink channel. By sending the aperiodic SRS once data newly arrives in the uplink data buffer, i.e., becomes available, it is possible to ensure that link adaptation can be quickly and reliably achieved thereafter.

In the following, exemplary structures for realizing the network node 100, in particular when being embodied as a base station such as the eNB 100 described above, will be explained in more detail. Reference is made to the eNB 100 without loss of generality.

In FIG. 8, the eNB 100 is illustrated in more detail. The eNB 100 comprises at least one processor 101-1. The processor(s) 101-1 can receive messages from the UE 10 via an interface 101-2 of the eNB 100; an uplink channel 151 may be employed for this. The eNB 100, optionally operationally executed by the processor(s) 101-1, can also send messages to the UE 10 via the interface 101-2, e.g., by employing a downlink channel 152. The processor(s) 101-1 may be implemented as a multi-core processing entity or may rely on shared computing of the processors 101-1. The processor(s) 101-1 can be coupled with a memory 101-3 of the eNB 100. The memory 101-3 can be a volatile or non-volatile memory. The memory 101-3 can store program code to be executed by the processor(s) 101-1.

In FIG. 9, the UE 10 is illustrated in more detail. The UE comprises at least one processor 11-1. The processor(s) 11-1 can receive messages from the eNB 100 via an interface 11-2 of the UE 10; the downlink channel 152 may be employed for this. The UE 10, optionally operationally executed by the processor(s) 11-1 can also send messages to the eNB 100 via the interface 11-2, e.g., by employing the uplink channel 151. The processor(s) 11-1 may be implemented as a multi-core processing entity or may rely on distributed computing of the processors 101-1. The processor(s) 11-1 may be coupled with a memory 11-3 of the UE 10.

The memory 11-3 can be a volatile or a non-volatile memory. The memory 11-3 can store a program code to be executed by the processor(s) 11-1.

The logic for controlling the transmission of the SRS may reside at least partly at the UE 10 side and/or at least partly at the eNB 100 side. In other words, it is possible that the transmission of the SRS is controlled by the UE 10 and/or the eNB 100. To inform the respective other entity 10, 100, control signalling and/or rules may be employed. These rules may be predefined and/or pre-negotiated via control signalling.

The program code which is stored in at least one of the memories 11-3, 101-3 may enable to control the transmission of the SRS according to techniques as mentioned above and as explained hereinafter.

In FIG. 10, the uplink data buffer 400 of the UE 10 is illustrated schematically. The uplink data buffer 400 comprises data 110. In particular, the amount of data 110 exceeds a threshold amount of data 112 (indicated in FIG. 10 with a dashed line). The data 110 is scheduled for the uplink transmission via the uplink channel 151. Depending on whether the data 110 is available in the uplink data buffer 400 of the UE 100 or not, the UE 10 and/or the eNB 100 control the transmission of the SRS. E.g., if the amount of data 110 exceeds the threshold amount of data 112, the transmission of the SRS is controlled so as to allow for accurate link adaptation. Likewise, if the amount of data 110 does not exceed the threshold amount of data 112, the transmission of the SRS is controlled so as to allow for less accurate link adaptation. E.g., if the amount of data 110 exceeds the threshold amount of data 112, the transmission of the SRS is controlled so that the SRS is sent more frequently. Likewise, if the amount of data 110 does not exceed the threshold amount of data 112, the transmission of the SRS is controlled so that the SRS is sent less frequently. Variations to such rules and schemes of controlling the transmission of the SRS are possible.

Figure 11:
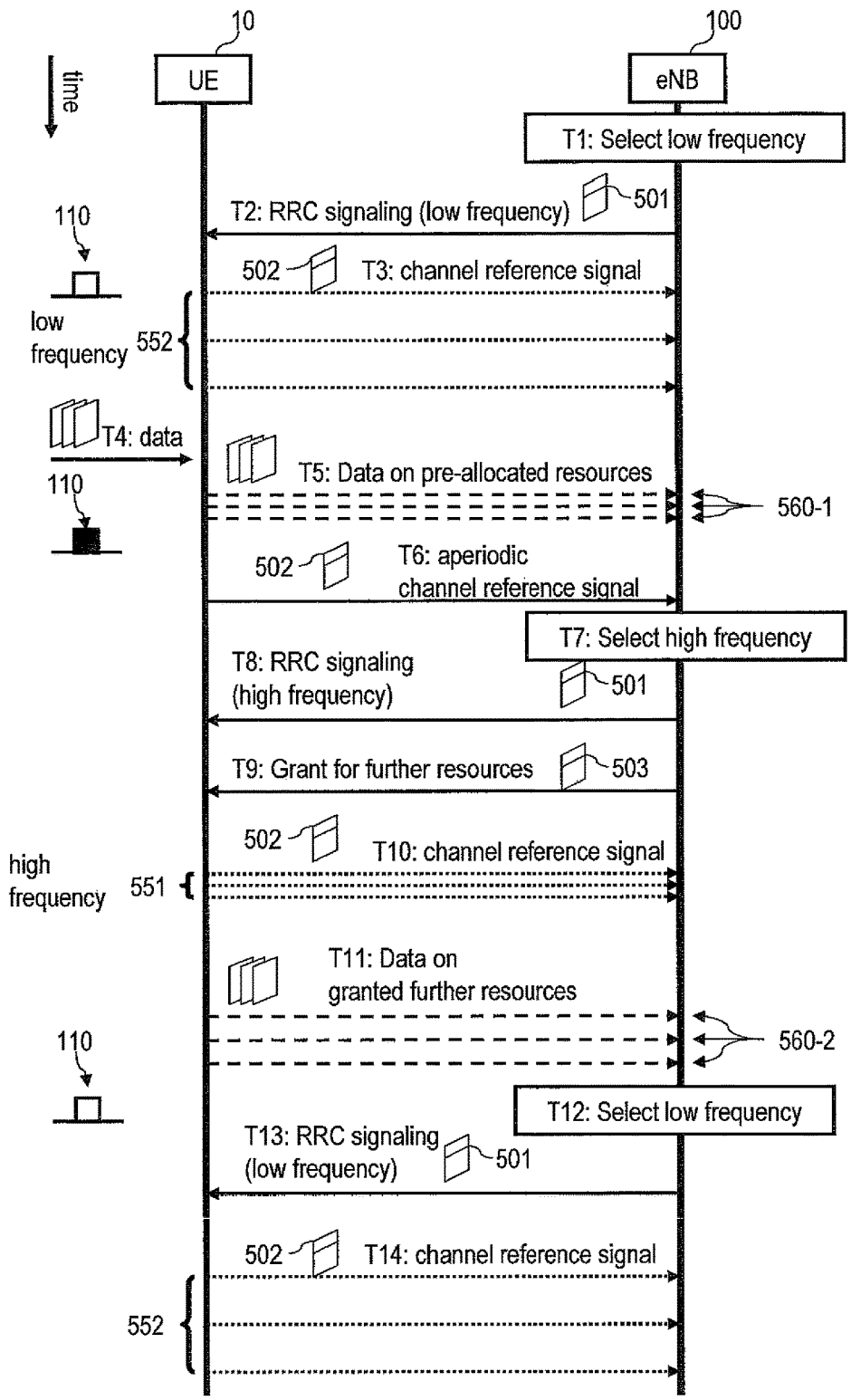
FIG. 11 is a signalling diagram for performing uplink transmission according to an embodiment of the invention in which a frequency of occurrence of the transmission of the channel reference signal is adapted.

In FIG. 11 a scenario of controlling the transmission of the SRS 502 is illustrated. In this scenario, the decision logic of controlling the transmission of the SRS 502 resides predominantly at the eNB 100. Initially, in step T1, a low frequency of occurrence 552 for the transmission of the SRS 502 is selected by the eNB 100. In step T2, a control message 501 is sent to the UE 10 in response to selecting the low frequency of occurrence 551 in step T1. The control message 501 indicates the selected low frequency of occurrence 552. The control message 501 further instructs the UE 10 to send future SRSs 502 employing the selected low frequency of occurrence 552.

E.g., the control message 501 can serve the further purpose of configuring parameters of the scheduling of uplink transmission. E.g., it is possible that the control message 501 prospectively allocates the uplink radio resources 560-1 in reoccurring time intervals to the UE 10. In this respect, the control message 501 may be embodied or may comprise an IUA uplink grant.

In step T3, the UE 10 sends the SRS 502 at the low frequency of occurrence 552 (indicated in FIG. 11 by the comparably large vertical distance between the dotted lines). As can be seen from FIG. 11, at the time of executing step T3, there is no data 110 available in the uplink data buffer 400 of the UE 10. Because no data 110 is available, the previously allocated uplink radio resources are not employed for transmission of data; instead no data or logical zeros (padded data) may be sent. The UE 10 is in the inactive mode. In this situation, as no data 110 is being transmitted, it is unnecessary to provide a comparably accurate link adaptation; this is why the low frequency of occurrence 552 of the transmission of the SRS 502 is selected. This low frequency of occurrence 552 for the transmission of the SRS allows for the UE 10 to reduce a power consumption. Further, other active UEs (not shown in FIG. 11) performing data transmission to and from the eNB 100 can also benefit from the low frequency of occurrence 552 because the other UEs can use more symbols of a subframe to transmit data on the uplink channel to the eNB 100.

Then, in step T4, data 110 becomes available in the uplink data buffer 400 of the UE 10. At least initially, the UE 10 sends this data employing the previously allocated uplink radio resources 560-1, i.e., via IUA-uplink TX (step T5). Further, in response to the data 110 becoming available in the uplink data buffer 400, the UE 10 sends the SRS 502 in a next time slot of a pre-determined transmission pattern for the transmission of the SRS 502, step T6. If a transmission of the SRS 502 was scheduled anyway at this next time slot of the pre-determined transmission pattern, this SRS 502 can be referred to as a periodic SRS 502.

Otherwise, this SRS 502 may be referred to as an aperiodic SRS 502—if there was no data 110 becoming available, no SRS 502 would be scheduled for periodic transmission. Here it is assumed that in step T6 an aperiodic SRS 502 is sent.

Further, in step T6, the eNB 100 receives the aperiodic SRS 502 in response to the UE 10 starting to perform the uplink transmission in step T5. From the receiving of the data 110 on the previously allocated uplink radio resources 560-1 in step T5, the eNB 100 is aware that the aperiodic SRS will be sent by the UE 10 in step T6; in can therefore prepare its receiver and will be ready to decode the SRS 502 on the closest next SRS subframe. Since this transmission of the aperiodic SRS 502 by the UE 10 in step T6 is configured by the eNB 100 according to general rules or policies in step T2, the eNB 100 has the respective information when and on which subcarriers the closest transmission of the aperiodic SRS 502 will occur in step T6. The eNB 100 assesses the quality of the uplink channel 151 based on the received SRS 502; this allows for rapid link adaptation once the UE 10 performs the uplink transmission.

As can be seen from the above, at least initially the UE 10 employs the previously allocated uplink radio resources 560-1 to perform the IUA-uplink TX of the data 110. The eNB 100 checks from time to time whether the UE 10 performs the uplink transmission employing the previously allocated uplink radio resources 560-1 on the uplink channel. E.g., if there is no data 110 in the uplink data buffer 400, the UE 10 sends padded data. E.g., if there is no data 110 in the uplink data buffer 400, it is also possible that the UE does not send signals at all; here, said checking whether the UE 10 performs the uplink transmission comprises detecting whether signals are received from the UE 10 on the uplink channel 151. Depending on this checking, the eNB 100 controls the transmission of the SRS 502. Because of this, in step T7—once the eNB 100 detects that the UE 10 performs the uplink transmission—a high frequency of occurrence 551 is selected for the transmission of the SRS 502; the high frequency of occurrence 551 corresponds to the transmission of the SRS 502 occurring more frequently. A respective control message 501 is sent to the UE 10 in step T8 and the UE 10 commences sending the SRS 502 employing the high frequency of occurrence 552, step T10. Such a scenario corresponds to an explicit re-configuration of the transmission of the SRS 502. For this, Radio Resource Control (RRC) signalling may be employed according to the 3GPP LTE radio access technology, step T8.

E.g., the high frequency of occurrence 551 can correspond to the transmission of the SRS 502 occurring on average every 2 ms-160 ms; while the low frequency of occurrence 552 can correspond to the transmission of the SRS 502 occurring on average every 20-2000 ms, preferably every 50-320 ms, more preferably every 80-160 ms. In general, it is also possible that the low frequency of occurrence 552 corresponds to no transmission of the SRS 502 occurring; respectively, the high frequency of occurrence 551 can correspond to a transmission of the SRS 502 occurring. In general, the frequency of occurrence 551, 552 may be strictly periodic or may correspond to an average value with a distributions of temporal distances between subsequent transmissions of the SRS 502.

As can be seen from FIG. 11, in response to said checking whether the UE 10 performs the uplink transmission employing the previously allocated uplink radio resources 560-1 and in case the uplink transmission is performed, it is possible that the eNB 100 sends a D-uplink grant 503 to the UE 10 in step T9. The D-uplink grant 503 may be sent on the PDCCH. The D-uplink grant 503 indicates further uplink radio resources allocated to the UE 10. This enables the UE 10 to send the remaining data 110 in the uplink data buffer 400 employing the further uplink radio resources 560-2, i.e., via D-uplink TX in step T11. The UE 10 is in active state. E.g., the sending of the data 110 employing the previously allocated uplink radio resources 560-1 may be an implicit request for the further uplink radio resources 560-2; however, alternatively or additionally, it is also possible that the UE 10 explicitly request the further uplink radio resources 560-2 by sending a respective scheduling request control message (not shown in FIG. 11). In step S5, also a BSR may be sent (not shown in FIG. 11).

Once the uplink transmission of the data 110 is completed, i.e., once the uplink data buffer 400 has been vacated, the eNB 100 selects the low frequency of occurrence 552, step T12. This may occur after not receiving any data from the UE 10 for a certain amount of time; an inactivity timer may be implemented in the eNB 100. After the respective control signalling, step T13, the UE 10 commences with sending the SRS 502 at the low frequency of occurrence 552, step T14. The UE 10 is again in inactive state.

Figure 12:
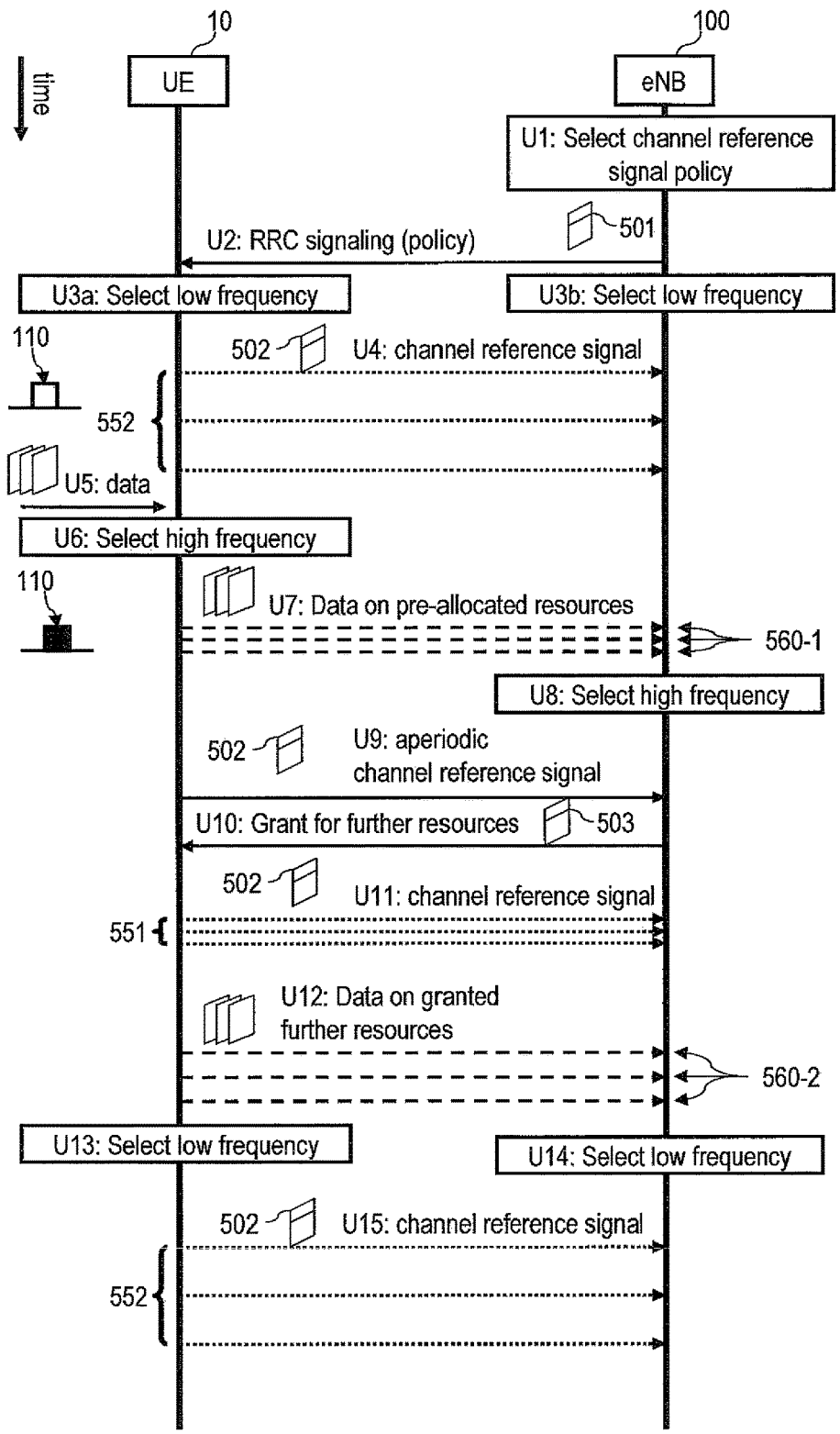
FIG. 12 is a signalling diagram for performing uplink transmission according to an embodiment of the invention in which a frequency of occurrence of the transmission of the channel reference signal is adapted.

In the scenario discussed above with respect to FIG. 11, the decision logic of controlling the transmission of the SRS 502 resides predominantly at the eNB 100. In particular, explicit reconfiguration of the transmission of the SRS 502 via RRC signalling is relied upon (cf. FIG. 11, steps T1, T8, and T13). In FIG. 12, a further scenario is illustrated in which, however, said decision logic of controlling the transmission of the SRS 502 is shared between the UE 10 and the eNB 100. In particular, the high frequency of occurrence 551 and the low frequency of occurrence 552 are initially negotiated between the UE 10 and the eNB 100. Then, the frequency of occurrence 551, 552 can be autonomously selected by, both, the UE 10 and the eNB 100 according to respective previously negotiated rules or policies. Such a scenario may be referred to as implicit reconfiguration.

In particular, in step U1, a policy for the transmission of the SRS 502 is selected and a respective control message is sent to the UE 10, step U2. In general it is possible that the negotiation of the policy involves bi-directional control message signalling. Parameter candidates may be exchanged and one or more of the candidates may be selected for implementation.

In the scenario of FIG. 12, because the UE 10 has newly attached to the cellular network and initially entered an ECM-connected state, it can be pre-configured with the low frequency of occurrence 551. The ECM-connected state describes a signalling state of the UE 10 with respect to a core of the part cellular network in the 3GPP LTE radio access technology. Consequently, in step U4, the UE 10 sends the SRS 502 at the low frequency of occurrence 552 and the eNB 100 receives the SRS 502 at the low frequency of occurrence 552. Alternatively or additionally, as initially no data 110 is available in the uplink data buffer 400 of the UE 10, according to the policy, both, the UE 10 and the eNB 100 select the low frequency of occurrence for the transmission of the SRS 502.

In step U6, data 110 becomes available in the uplink data buffer 400 of the UE 10. The UE 10 checks whether the data 110 is available in the uplink data buffer 400 for the uplink transmission employing the previously allocated uplink radio resources 560-1 on the uplink channel 151, i.e., IUA-uplink TX. At step U6, this check yields that the data 110 is available in the uplink data buffer 400 and consequently the UE 10 autonomously selects the high frequency of occurrence 551 for the transmission of the SRS 502. In other words, the UE 10 changes the frequency of occurrence 551 according to the policy received during the RRC signalling in step U2.

In step U7, the UE 10 sends the data 110 employing the previously allocated uplink radio resources 560-1, i.e., via IUA-uplink TX. The eNB 100 checks whether the UE 10 performs the uplink transmission employing the previously allocated uplink radio resources 560-1 and, in response to detecting that signals are received from the UE 10 on the uplink channel 502 in step U7, selects the high frequency of occurrence 551 in step U8. As can be seen from FIG. 12, because of the negotiated policy for the transmission of the SRS 502, both, the UE 10 and the eNB 100, can select the high frequency in a coordinated manner in steps U6 and U8 without the need of dedicated control signalling; however, it is possible to implement a scenario in which dedicated control signalling is employed: E.g., in response to selecting the high frequency of occurrence 551 for the transmission of the SRS 502 in step U6, the UE may send a respective control message to the eNB 100, thereby informing the eNB 100 of the change in the frequency of occurrence 551, 552 (not shown in FIG. 12).

In step U9, the UE 10 sends an aperiodic SRS 502; i.e., due to the data 110 becoming available in the uplink data buffer 400, the UE 10 sends the SRS 502 in the next time slot of a pre-determined transmission pattern for the transmission of the SRS 502. E.g., the transmission pattern can be negotiated between the eNB 100 and the UE 10 as part of the control signalling of step U2.

In step U10, the eNB 100 sends an D-uplink grant 503 for the further uplink radio resources 560-2 allocated to the UE 10, e.g., on the PDCCH. The D-uplink grant 503 is requested at least implicitly be the UE 10 by sending the data 110 in step U7 employing the periodically reoccurring uplink radio resources 560-1. Then, in step U11, the UE 10 sends the SRS 502 employing the previously selected high frequency of occurrence 501; further, in step U2, the UE 10 sends the data 110 remaining in the uplink data buffer 400 employing the further uplink radio resources 560-2 for which the D-uplink grant 503 has been received in step U10, i.e., via D-uplink TX.

Eventually, the uplink data buffer 400 of the UE 10 has been emptied and no data 110 is transmitted on the uplink channel 151 by the UE 10. Then, both the UE 10 and the eNB 100 select a low frequency of occurrence 552 for the transmission of the SRS 502 (steps U13, U14). In step U15, the UE 10 sends the SRS 502 employing the low frequency of occurrence 552. Reverting back to the low frequency of occurrence 552 in steps U13 and U14 may occur after a respective inactivity timer has lapsed in, both, the UE 10 and the eNB 100—which corresponds to an implicit synchronisation of the control of the transmission of the SRS 502 between the UE 10 and the eNB 100 if compared to the explicit scenario of step T13 in FIG. 11.

As will be appreciated from the above, the decision criterion for the UE 10 to control the transmission of the SRS 502 is whether the data 110 is available in the uplink data buffer 400 or not; in the scenario of FIG. 12, it is not necessary to take into account further decision criterions. However, it is generally possible to take into account further decisions criterions for the control of the transmission of the SRS. E.g., the controlling of the transmission of the SRS 502 can further depend on the UE 10 receiving the D-uplink grant 503 (see step 502 in FIG. 12). E.g., the high frequency of occurrence 551 may be selected if the data 110 is available in the uplink data buffer 400 and the uplink grant 503 has been received. E.g., the low frequency of occurrence 551 may be selected if there is no data 110 available in the uplink data buffer 400.

Above, with respect to the FIGS. 5 and 6, scenarios have been discussed in which the transmission of the SRS 502 is controlled in terms of selecting the frequency of occurrence 551, 552. However, in general other or further parameters of the transmission of the SRS 502 can be selected as part of the controlling. Generally, a parameter indicating the timing of the transmission of the SRS 502 can be selected. Alternatively or additionally, also a property of the SRS 502 itself could be selected. Such a property of a SRS 502 can be the SRS transmission bandwidth, i.e., the bandwidth covered by a single transmission of the SRS 502. A further property of the SRS 502 can be the frequency-domain position, i.e., a starting point of the transmission of the SRS 502 in the frequency domain. A further property of the SRS 502 can be a so-called phase rotation or cyclic shift of the SRS 502. This enables several users to transmit their SRS 502 at the same frequency at the same time by employing different phases. A parameter indicating the timing of the transmission of the SRS 502 can be, e.g., a subframe offset or a transmission comb specifying on which part of the bandwidth the transmission of the SRS 502 takes place. E.g., subsequent transmissions of the SRS 502 can occur in different positions in frequency space.

Above, with respect to FIG. 12, a scenario has been illustrated in which the decision logic for controlling the transmission of the SRS 502 is shared between the UE 10 and eNB 100 by negotiating a respective policy. However, as mentioned above, also a scenario is possible in which the decision logic resides predominantly at the UE 10. In particular, in such a scenario it is possible that, in response to selecting the frequency of occurrence 551, 552 (steps U3, U6 and U13 in FIG. 12), the UE 10 sends a respective control message to the eNB 100. The control message can indicate the selected frequency of occurrence 551, 552.

Figure 13:
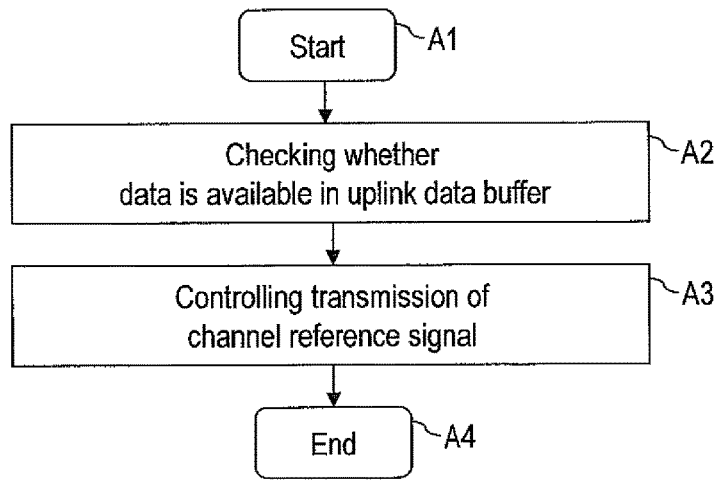
FIG. 13 is a flowchart of a method of controlling a transmission of a channel reference signal according to various embodiments in which control logic resides primarily on a UE side.

In FIG. 13, a flowchart of a method of controlling the transmission of the SRS 502 on the uplink channel 151 from the UE 10 to the cellular network is illustrated. The method starts with step A1. In step A2, the UE 10 check whether data 110 is available in the uplink data buffer 400. Depending on this checking, in step A3, the UE 10 controls the transmission of the SRS 502. In step A3, various parameters of the transmission of the SRS 502 can be controlled. E.g., a timing of the transmission of the SRS 502 can be controlled. Further, properties of the SRS 502 itself can be controlled.

As part of step A3, it is possible to employ control signalling which informs the eNB 100 on changes and adaptations to the transmission of the SRS 502. However, it is also possible that the eNB 100 is implicitly informed about any changes to the transmission of the SRS 502, e.g., by means of previously negotiated policies. Then, the eNB 100 may autonomously adapt its operation to the transmission control of step A3 executed by the UE 10. The method ends in step A4.

Figure 14:
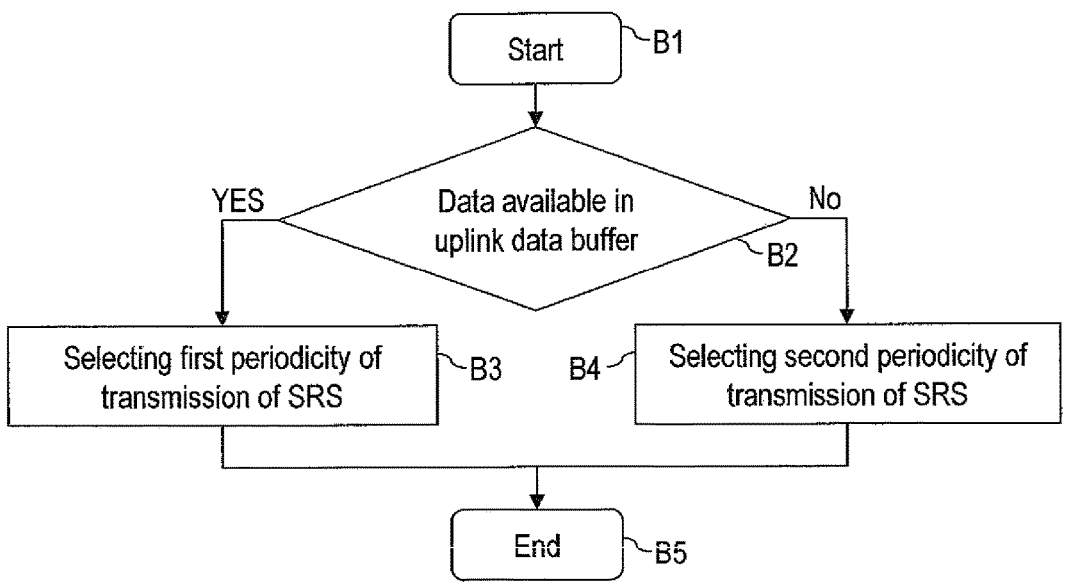
FIG. 14 is a flowchart of a method of controlling a transmission of a channel reference signal according to various embodiments in which control logic resides primarily on a UE side.

In FIG. 14, a flowchart of a method of controlling the transmission of a SRS 502 on the uplink channel 151 from the UE 10 to the cellular network is illustrated. The method starts in step B1. In step B2, the UE 10 checks whether data 110 is available in the uplink data buffer 400. If data is available in the uplink data buffer, in step B3, a first periodicity of transmission of the SRS 502 is selected; e.g., the first periodicity can correspond to the high frequency of occurrence 551.

In general, it is not necessary to select a strict periodic transmission of the SRS 502; rather, a certain distribution of periodicities for the transmission of the SRS 502 can be selected in which the SRS is transmitted on average more or less frequently.

If, in step B2, it is detected that no data 110 is available in the uplink data buffer 400 of the UE 10, then, in step 4, a second periodicity of transmission of the SRS 502 is selected; e.g., the second periodicity can correspond to the low frequency of occurrence 552. The method ends in step B5.

Figure 15:
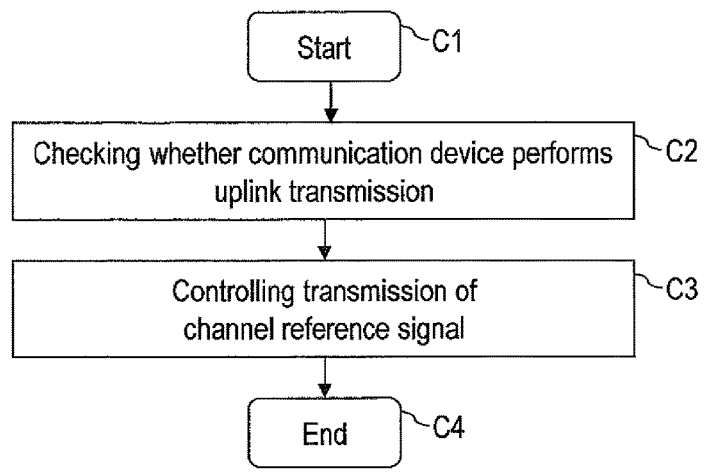
FIG. 15 is a flowchart of a method of controlling a transmission of a channel reference signal according to various embodiments in which control logic resides primarily on a network side.

In FIG. 15, a flowchart of a method of controlling the transmission of a SRS 502 on an uplink channel 151 between the UE 10 and a cellular network is illustrated. The method starts in step C1. In step C2, the eNB 100 checks whether the UE 10 performs uplink transmission of data 110. For this purpose, the eNB 100 can detect whether signal are received from the UE 10 on the uplink channel 151. In particular, as there is no data 110 in the uplink data buffer 400 of the UE 10, instead of sending padded data, the UE 10 may refrain from sending data at all.

Next, in step C3, the eNB 100 controls the transmission of the SRS 502. This can occur in a manner similar to the techniques as explained above with respect to step A3 of FIG. 13. In particular, various parameters of the transmission of the SRS 502 can be selected, including, but not limited to, a parameter indicating at least one of a timing of the transmission of the SRS 502 and a property of the SRS 502.

In a similar manner as explained above with respect to step A3 in FIG. 13 for the UE 10 scenario, as part of step C3, the eNB 100 may actively inform the UE 10 of any changes or adaptations to the transmission of the SRS 502. This may occur via control signalling. However, it is also possible that, e.g., as part of previously negotiated policies, the UE 10 is implicitly informed, e.g., by the fact that there is data 110 available for the uplink transmission in the uplink data buffer 400. Then, the UE 10 may autonomously adapt its operation to the control of step C3.

The method ends in step C4.

Figure 16:
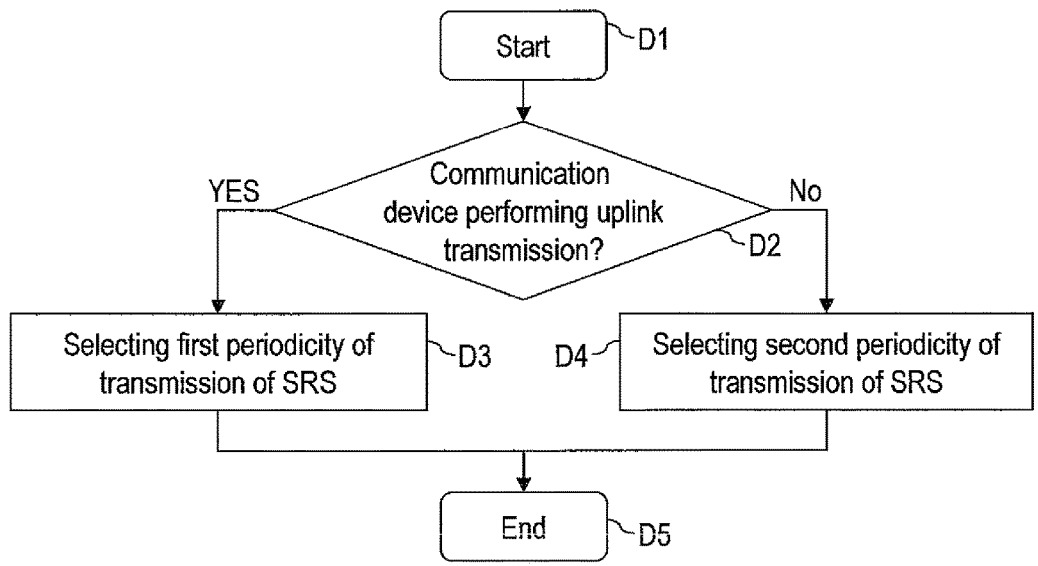
FIG. 16 is a flowchart of a method of controlling a transmission of a channel reference signal according to various embodiments in which control logic resides primarily on a network side.

FIG. 16 shows a flowchart of a method of controlling the transmission of the SRS 502 on the uplink channel 151 from the UE 10 to the cellular network. The method starts with step D1. In step D2, it is checked whether the UE 10 performs the uplink transmission on the uplink channel 151. If the UE 10 performs the uplink transmission and, e.g., if the buffer status is above a certain threshold, then, in step D3, a first periodicity of the transmission of the SRS 502 is selected. E.g., the first periodicity can correspond to the high frequency of occurrence 551.

If in step D2 it is detected that the UE 10 does not perform the uplink transmission, then, in step D4, a second periodicity of transmission of the SRS 502 is selected. E.g., the second periodicity can correspond to the low frequency of occurrence 552. The method ends in step D5.

Summarizing, above techniques have been illustrated which allow to flexibly adapt the transmission of a channel reference signal depending on whether data is available for uplink transmission. This is particularly applicable in a framework in which the UE can transmit data employing uplink radio resources which have been previously allocated in reoccurring time intervals. Namely, as in such a scenario it may be unnecessary to perform a comparably accurate link adaptation when there is no data to be transmitted, the respective parameters of the transmission of the channel reference signal may be adapted accordingly to reduce UE power consumption and save capacity on the uplink channel.

As can be further seen, the concepts as described above may be used for achieving a low latency for uplink transmissions by a communication device. Specifically, by allowing conditional utilization of the uplink radio resources allocated in reoccurring time intervals, an energy efficient operation of the communication device and low interference level may be achieved.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A method, by a communication device, of controlling a transmission of a channel reference signal on an uplink channel from the communication device to a cellular network, the channel reference signal enabling assessment of a quality of the uplink channel, the method comprising:
   checking whether data is available in an uplink data buffer of the communication device for uplink transmission employing uplink radio resources on the uplink channel, the uplink radio resources being previously allocated to the communication device in reoccurring time intervals; and
   depending on said checking, controlling the transmission of the channel reference signal, wherein controlling the transmission of the channel reference signal comprises autonomously selecting a frequency of occurrence for the transmission of the channel reference signal, said selecting comprising selecting a first frequency of occurrence or a second frequency of occurrence in dependence on the presence or amount of data available in the uplink buffer,
   determining a threshold amount of data in dependence on the uplink radio resources previously allocated to the communication device,
   wherein said selecting the first frequency of occurrence or the second frequency of occurrence comprises selecting the first frequency of occurrence in response to determining that there is more than the threshold amount of data in the uplink buffer and otherwise selecting the second frequency of occurrence,
      wherein the first frequency of occurrence corresponds to the transmission of the channel reference signal occurring more frequently than the second frequency of occurrence,
      wherein:
      the second frequency of occurrence corresponds to the transmission of the channel reference signal occurring on average every 50-320 ms; and
      the first frequency of occurrence corresponds to the transmission of the channel reference signal occurring on average every 2-160 ms, and
   wherein the threshold amount of data is greater than zero.

2. The method according to claim 1, further comprising:
   in response to data becoming available in the uplink data buffer, sending the channel reference signal in a next time slot of a pre-determined transmission pattern for the transmission of the channel reference signal.

3. The method according to claim 1, further comprising:
   wherein controlling the transmission of the channel reference signal comprises selecting a parameter for the transmission of the channel reference signal, the parameter indicating at least one of a timing of the transmission of the channel reference signal and a property of the channel reference signal.

4. A communication device configured to control a transmission of a channel reference signal on an uplink channel from the communication device to a cellular network, the channel reference signal enabling assessment of a quality of the uplink channel, the communication device comprising:
   an interface circuit configured to transmit the channel reference signal; and at least one processor operatively associated with the interface circuit and configured to:
  check whether data is available in an uplink data buffer of the communication device for uplink transmission employing uplink radio resources on the uplink channel, the uplink radio resources being previously allocated to the communication device in reoccurring time intervals; and
  control the transmission of the channel reference signal via the interface circuit in dependence on said checking, said control comprising autonomously selecting a frequency of occurrence for the transmission of the channel reference signal, and said selecting comprising selecting a first frequency of occurrence or a second frequency of occurrence in dependence on the presence or amount of data available in the uplink data buffer; and
determine a threshold amount of data in dependence on the uplink radio resources previously allocated to the communication device,
  wherein said selecting the first frequency of occurrence or the second frequency of occurrence comprises selecting the first frequency of occurrence in response to determining that there is more than the threshold amount of data in the uplink buffer and otherwise selecting the second frequency of occurrence,
  wherein the first frequency of occurrence corresponds to the transmission of the channel reference signal occurring more frequently than the second frequency of occurrence, and
  wherein:
    the second frequency of occurrence corresponds to the transmission of the channel reference signal occurring on average every 50-320 ms; and
    the first frequency of occurrence corresponds to the transmission of the channel reference signal occurring on average every 2-160 ms, and
  wherein the threshold amount of data is greater than zero.

5. The communication device according to claim 4, wherein the at least one processor is configured to:
  in response to data becoming available in the uplink data buffer, send the channel reference signal in a next time slot of a pre-determined transmission pattern for the transmission of the channel reference signal.

6. The communication device according to claim 4, wherein the at least one processor is configured to:
  control the transmission of the channel reference signal by selecting a parameter for the transmission of the channel reference signal, the parameter indicating at least one of a timing of the transmission of the channel reference signal and a property of the channel reference signal.

7. A method, by a network node of a cellular network, of controlling a transmission of a channel reference signal on an uplink channel between a communication device and the cellular network, the channel reference signal enabling assessment of a quality of the uplink channel, the method comprising:
  checking whether the communication device performs an uplink transmission employing uplink radio resources on the uplink channel, the uplink radio resources being previously allocated to the communication device in reoccurring time intervals; and
  depending on said checking, controlling the transmission of the channel reference signal,
  wherein controlling the transmission of the channel reference signal comprises autonomously selecting a frequency of occurrence for the transmission of the channel reference signal, said selecting comprising selecting a first frequency of occurrence or a second frequency of occurrence in dependence on the presence or amount of data available in the uplink buffer,
  wherein the method further comprises determining a threshold amount of data in dependence on the uplink radio resources previously allocated to the communication device,
  wherein said selecting the first frequency of occurrence or the second frequency of occurrence comprises selecting the first frequency of occurrence in response to determining that there is more than the threshold amount of data in the uplink buffer and otherwise selecting the second frequency of occurrence,
    wherein the first frequency of occurrence corresponds to the transmission of the channel reference signal occurring more frequently than the second frequency of occurrence,
    wherein:
    the second frequency of occurrence corresponds to the transmission of the channel reference signal occurring on average every 50-320 ms; and
    the first frequency of occurrence corresponds to the transmission of the channel reference signal occurring on average every 2-160 ms, and
  wherein the threshold amount of data is greater than zero.

8. The method according to claim 7, further comprising:
  in response to the communication device starting to perform the uplink transmission, receiving the channel reference signal in a next time slot of a pre-determined transmission pattern for the transmission of the channel reference signal.

9. The method according to claim 7, wherein checking whether the communication device performs the uplink transmission comprises detecting whether signals are received from the communication device on the uplink channel.

10. The method according to claim 7, further comprising:
  in response to said selecting of the frequency of occurrence, sending a control message to the communication device, the control message indicating the selected frequency of occurrence and instructing the communication device to send future channel reference signals employing the selected frequency of occurrence.

11. The method according to claim 7, further comprising:
  in response to said checking and in response to determining that the uplink transmission is performed, sending an uplink grant to the communication device, the uplink grant indicating further uplink radio resources allocated to the communication device.

12. The method according to claim 7, wherein controlling the transmission of the channel reference signal comprises selecting a parameter indicating at least one of a timing of the transmission of the channel reference signal and a property of the channel reference signal.

13. A network node of a cellular network configured to control a transmission of a channel reference signal on an uplink channel between a communication device and the cellular network, the channel reference signal enabling assessment of a quality of the uplink channel, the network node comprising:
  an interface circuit configured to receive an uplink transmission from the communication device; and
  at least one processor configured to:
    check whether the communication device performs the uplink transmission employing uplink radio resources on the uplink channel, the uplink radio resources being previously allocated to the communication device in reoccurring time intervals;

depending on said check, control the transmission of the channel reference signal via the interface circuit in dependence on said checking, said control comprising autonomously selecting a frequency of occurrence for the transmission of the channel reference signal, and said selecting comprising selecting a first frequency of occurrence or a second frequency of occurrence in dependence on the presence or amount of data available in the uplink data buffer; and determining a threshold amount of data in dependence on the uplink radio resources previously allocated to the communication device, wherein said selecting the first frequency of occurrence or the second frequency of occurrence comprises selecting the first frequency of occurrence in response to determining that there is more than the threshold amount of data in the uplink buffer and otherwise selecting the second frequency of occurrence, wherein the first frequency of occurrence corresponds to the transmission of the channel reference signal occurring more frequently than the second frequency of occurrence, and wherein:

the second frequency of occurrence corresponds to the transmission of the channel reference signal occurring on average every 50-320 ms; and the first frequency of occurrence corresponds to the transmission of the channel reference signal occurring on average every 2-160 ms, and wherein the threshold amount of data is greater than zero.

14. The network node according to claim 13, wherein the at least one processor is configured to:

in response to the communication device starting to perform the uplink transmission, receive the channel reference signal in a next time slot of a pre-determined transmission pattern for the transmission of the channel reference signal.

15. The network node according to claim 13, wherein the at least one processor is configured to:

check whether the communication device performs the uplink transmission by detecting whether signals are received from the communication device on the uplink channel.

16. The network node according to claim 13, wherein the at least one processor is configured to:

in response to said selecting of the frequency of occurrence, send a control message to the communication device, the control message indicating the selected frequency of occurrence and instructing the communication device to send future channel reference signals employing the selected frequency of occurrence.

17. The network node according to claim 13, wherein the at least one processor is configured to:

in response to said checking and in response to determining that the uplink transmission is performed, send an uplink grant to the communication device, the uplink grant indicating further uplink radio resources allocated to the communication device.

18. The network node according to claim 13, wherein the at least one processor is configured to:

control the transmission of the channel reference signal by selecting a parameter indicating at least one of a timing of the transmission of the channel reference signal and a property of the channel reference signal.

19. A non-transitory computer readable storage medium storing a computer program for controlling a transmission of a channel reference signal on an uplink channel from a communication device to a cellular network, the channel reference signal enabling assessment of a quality of the uplink channel, the computer program comprising program code that when executed by at least one processor of the communication device configured to be connected to the cellular network, causes the communication device to:

check whether data is available in an uplink data buffer of the communication device for uplink transmission employing uplink radio resources on the uplink channel, the uplink radio resources being previously allocated to the communication device in reoccurring time intervals;

control the transmission of the channel reference signal in dependence on said checking, said control comprising autonomously selecting a frequency of occurrence for the transmission of the channel reference signal, and said selecting comprising selecting a first frequency of occurrence or a second frequency of occurrence in dependence on the presence or amount of data available in the uplink data buffer; and determine a threshold amount of data in dependence on the uplink radio resources previously allocated to the communication device, wherein said selecting the first frequency of occurrence or the second frequency of occurrence comprises selecting the first frequency of occurrence in response to determining that there is more than the threshold amount of data in the uplink buffer and otherwise selecting the second frequency of occurrence, wherein the first frequency of occurrence corresponds to the transmission of the channel reference signal occurring more frequently than the second frequency of occurrence, and wherein:

the second frequency of occurrence corresponds to the transmission of the channel reference signal occurring on average every 50-320 ms; and the first frequency of occurrence corresponds to the transmission of the channel reference signal occurring on average every 2-160 ms, and wherein the threshold amount of data is greater than zero.

20. A non-transitory computer readable storage medium storing a computer program for controlling a transmission of a channel reference signal on an uplink channel between a communication device and a cellular network, the channel reference signal enabling assessment of a quality of the uplink channel, the computer program comprising program code that when executed by at least one processor of a network node for the cellular network, causes the network node to:

check whether the communication device performs the uplink transmission employing uplink radio resources on the uplink channel, the uplink radio resources being previously allocated to the communication device in reoccurring time intervals;

depending on said check, control the transmission of the channel reference signal in dependence on said checking, said control comprising autonomously selecting a frequency of occurrence for the transmission of the channel reference signal, and said selecting comprising selecting a first frequency of occurrence or a second frequency of occurrence in dependence on the presence or amount of data available in the uplink data buffer; and determining a threshold amount of data in dependence on the uplink radio resources previously allocated to the communication device, wherein said selecting the first frequency of occurrence or the second frequency of occurrence comprises selecting the first frequency of occurrence in response to determining that there is more than the threshold amount of data in the uplink buffer and otherwise selecting the second frequency of occurrence, wherein the first frequency of occurrence corresponds to the transmission of the channel reference signal occurring more frequently than the second frequency of occurrence, and wherein:

the second frequency of occurrence corresponds to the transmission of the channel reference signal occurring on average every 50-320 ms; and the first frequency of occurrence corresponds to the transmission of the channel reference signal occurring on average every 2-160 ms, and wherein the threshold amount of data is greater than zero.

* * * * *